US007013342B2

(12) United States Patent
Riddle

(10) Patent No.: US 7,013,342 B2
(45) Date of Patent: Mar. 14, 2006

(54) DYNAMIC TUNNEL PROBING IN A COMMUNICATIONS NETWORK

(75) Inventor: Guy Riddle, Los Gatos, CA (US)

(73) Assignee: Packeteer, Inc., Cupertino, CA (US)

( * ) Notice: Subject to any disclaimer, the term of this patent is extended or adjusted under 35 U.S.C. 154(b) by 720 days.

(21) Appl. No.: 10/015,826

(22) Filed: Dec. 10, 2001

(65) Prior Publication Data

US 2003/0110276 A1    Jun. 12, 2003

(51) Int. Cl.
*G06F 15/16* (2006.01)

(52) U.S. Cl. .................... 709/230; 709/237; 370/235

(58) Field of Classification Search ............. 709/220, 709/221, 222, 223, 224, 230, 237, 238; 370/229, 370/231, 235, 237
See application file for complete search history.

(56) References Cited

U.S. PATENT DOCUMENTS

| 6,058,421 | A  | * | 5/2000  | Fijolek et al. ............. 709/225 |
| 6,366,563 | B1 | * | 4/2002  | Weldon et al. ............. 370/252 |
| 6,650,620 | B1 | * | 11/2003 | Neogi ....................... 370/231 |
| 6,701,437 | B1 | * | 3/2004  | Hoke et al. ................ 713/201 |
| 6,708,218 | B1 | * | 3/2004  | Ellington et al. .......... 709/236 |
| 6,754,831 | B1 | * | 6/2004  | Brownell ................... 713/201 |
| 6,765,881 | B1 | * | 7/2004  | Rajakarunanayake ....... 370/256 |
| 6,795,917 | B1 | * | 9/2004  | Ylonen ...................... 713/160 |
| 6,799,220 | B1 | * | 9/2004  | Merritt et al. ............. 709/238 |
| 6,804,776 | B1 | * | 10/2004 | Lothberg et al. .......... 713/160 |
| 6,816,912 | B1 | * | 11/2004 | Borella et al. ............. 709/238 |
| 6,829,709 | B1 | * | 12/2004 | Acharya et al. ........... 713/160 |

OTHER PUBLICATIONS

Zhao Aqun; Yuan Yuan; Ji Yi; Gu Guanqun; "Research on tunneling techniques in virtual private networks" Communications Technology Proceedings, 2000. WCC-ICCT 2000. International Conference on , vol.: 1, Aug. 21-25, 2000 pp:691-697 vol. 1.*
Higgins, L.; McDowell, G.; VonTobel, B.; "Tunneling multicast through non-multicast-aware networks and encryption devices" Military Communications Conference, 2001. MILCOM 2001, IEEE , vol.: 1, Oct. 28-31, 2001 pp:296-300 vol. 1.*
Braden, R. et al.; "Resource ReSerVation Protocol (RSVP)—Version 1 Functional Specification", Request for Comments (RFC) 2205; Network Working Group, Sep. 1997.*
Melinda Shore, "Towards a Network-friendlier Midcom," IETF Internet Draft, Oct. 2001; http://search.ietf.org/internet-drafts/draft-shore-friendly-midocm-00.txt.

* cited by examiner

Primary Examiner—Marc D. Thompson
(74) Attorney, Agent, or Firm—Mark J. Spolyar

(57) ABSTRACT

Methods, apparatuses and systems allowing for dynamic detection of network devices, located along communications paths associated with a computer network, that include compatible transformation tunneling capabilities. In one embodiment, a tunnel probing device, having transformation tunneling capabilities, monitors data flows to respective destination hosts and probes for other network devices, having compatible transformation tunneling capabilities, located along respective communications paths to the destination hosts. A network device in a communications path, recognizing probes transmitted by the tunnel probing device, responds to the probe by communicating its transformation tunneling capabilities, and passes the probe along the path to the destination host for possible recognition by other compatible network devices. The present invention allows for recognition and optimization of network traffic between network devices without prior configuration.

29 Claims, 7 Drawing Sheets

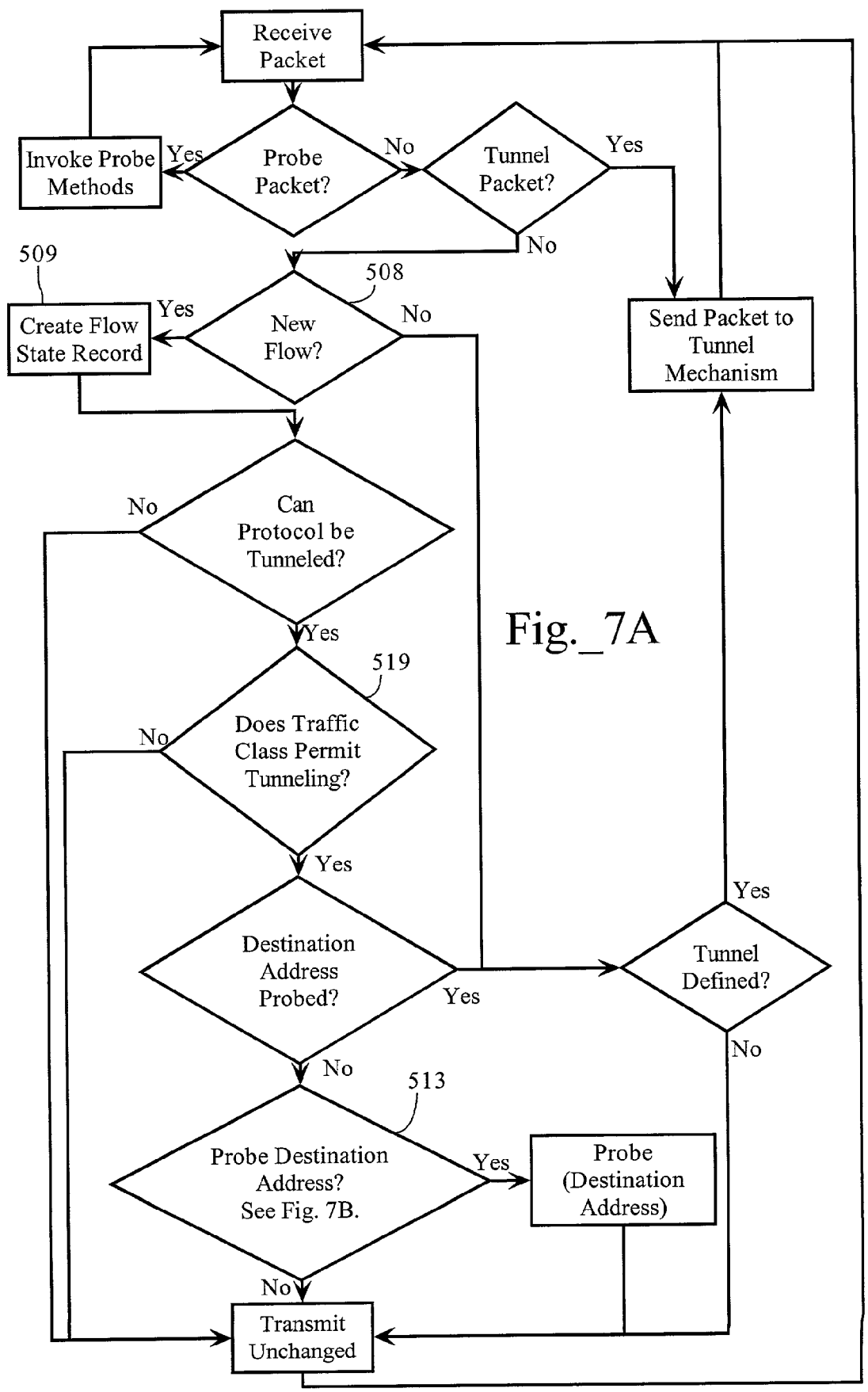

DYNAMIC TUNNEL PROBING IN A COMMUNICATIONS NETWORK

CROSS-REFERENCE TO RELATED APPLICATIONS

This application makes reference to the following commonly owned U.S. patent applications and patents, which are incorporated herein by reference in their entirety for all purposes:

U.S. patent application Ser. No. 08/762,828, now U.S. Pat. No. 5,802,106 in the name of Robert L. Packer, entitled "Method for Rapid Data Rate Detection in a Packet Communication Environment Without Data Rate Supervision;"

U.S. patent application Ser. No. 08/742,994 now U.S. Pat. No. 6,038,216, in the name of Robert L. Packer, entitled "Method for Explicit Data Rate Control in a Packet Communication Environment Without a Data Rate Supervision;"

U.S. patent application Ser. No. 09/977,642 now U.S. Pat. No. 6,046,980, in the name of Robert L. Packer, entitled "System for Managing Flow Bandwidth Utilization at Network, Transport and Application Layers in Store and Forward Network;" and U.S. patent application Ser. No. 09/198,090, now U.S. Pat. No. 6,412,000, in the name of Guy Riddle and Robert L. Packer, entitled "Method for Automatically Classifying Traffic in a Packet Communications Network."

FIELD OF THE INVENTION

The present invention relates to computer networks and, more particularly, to methods, apparatuses and systems allowing for dynamic identification of routing nodes or other network devices disposed along a communications path that include compatible transformation tunneling capabilities.

BACKGROUND OF THE INVENTION

Businesses are growing increasingly dependent on distributed computing environments and wide area computer networks to accomplish critical tasks. Indeed, a wide variety of business applications are deployed across intranet, extranet and Internet connections to effect essential communications with workers, business partners and customers. As the number of users, applications and external traffic increases, however, network congestion forms, impairing business application performance. Enterprise network managers, therefore, are constantly challenged with determining the volume, origin and nature of network traffic to align network resources with business priorities and applications.

Data compression, caching and other technologies that optimize network traffic can be deployed to improve the efficiency and performance of a computer network and ease congestion at bottleneck links. For example, implementing data compression and/or caching technology can improve network performance by reducing the amount of bandwidth required to transmit a given block of data between two network devices along a communications path. Data compression technologies can be implemented on routing nodes without alteration of client or server end systems, or software applications executed therein, to reduce bandwidth requirements along particularly congested portions of a communications path. For example, tunnel technologies, like those used in Virtual Private Network (VPN) implementations, establish tunnels through which network traffic is transformed upon entering at a first network device in a communications path and restored to substantially the same state upon leaving a second network device. Such tunnel technologies, however, can only be implemented to improve network performance of a limited number of pre-configured communications paths, as they require a network administrator to manually configure at least two nodes in each path [such nodes are typically a VPN server deployed on the enterprise's network and a VPN client remote from the enterprise network]. These technologies, however, do not automatically identify a routing node or other network device in a communications path that includes functionality allowing for the creation of transformation tunnels to optimize or otherwise enhance network performance.

Given the vast array of routing nodes, each including a variety of configurations and capabilities, distributed across modern computer networks, the challenge becomes determining which communications paths can be optimized or otherwise tunneled in this manner, as altering network traffic at one node along a path in a way not recoverable or understood by the destination end-system will result in communication failures, if there is no network device along the path to reverse the transformation. Existing technologies would require a network administrator to manually discover and configure hundreds, and even thousands, of transformation tunnels to enhance network performance for a substantial amount of network traffic. In light of the foregoing, a need exists in the art for methods, apparatuses and systems that facilitate determinations as to whether there exists another network device along a communications path that is capable of establishing a compatible transformation tunnel. The present invention substantially fulfills this need.

SUMMARY OF THE INVENTION

The present invention provides methods, apparatuses and systems allowing for dynamic detection of network devices, located along communications paths associated with a computer network, that include compatible transformation tunneling capabilities. In one embodiment, a tunnel probing device, having transformation tunneling capabilities, monitors data flows to respective destination hosts and probes for other network devices, having compatible transformation tunneling capabilities, located along respective communications paths to the destination hosts. A network device in a communications path, recognizing probes transmitted by the tunnel probing device, responds to the probe by communicating its transformation tunneling capabilities, and passes the probe along the path to the destination host for possible recognition by other compatible network devices.

The present invention allows for recognition and optimization of network traffic between network devices without prior configuration. The present invention also permits optimization of network traffic between network devices owned by different administrations or enterprises. In one embodiment, when a new data flow begins to a destination host for which there is no knowledge of a compatible transformation tunnel, a tunnel probing device sends a probe packet to the destination host to determine if any other network devices along the path have compatible transformation tunneling capabilities, such as compression, caching, etc. Each network device along the path that recognizes the probe packet transmits a probe response packet describing the transformation tunnel capabilities of the device. The tunnel probing device, in one embodiment, remembers the computer network address of the device furthest away (in one embodiment, by comparing TTL values of the response) that has compatible transformation tunneling capabilities and associates this network device with the original destination host in a database. Subsequent network traffic to the destination host is placed into the transformation tunnel. In one embodiment, if no probe responses are returned, the destination host is marked in the database as non-tunneled, and the path to that destination host is probed no further.

DESCRIPTION OF THE DRAWINGS

FIG. 7A is a flow chart diagram showing a method associated with an alternative embodiment of the present invention.

FIG. 7B is a flow chart diagram illustrating a second method associated with an alternative embodiment of the present invention.

DESCRIPTION OF PREFERRED EMBODIMENT(S)

Figure 1:
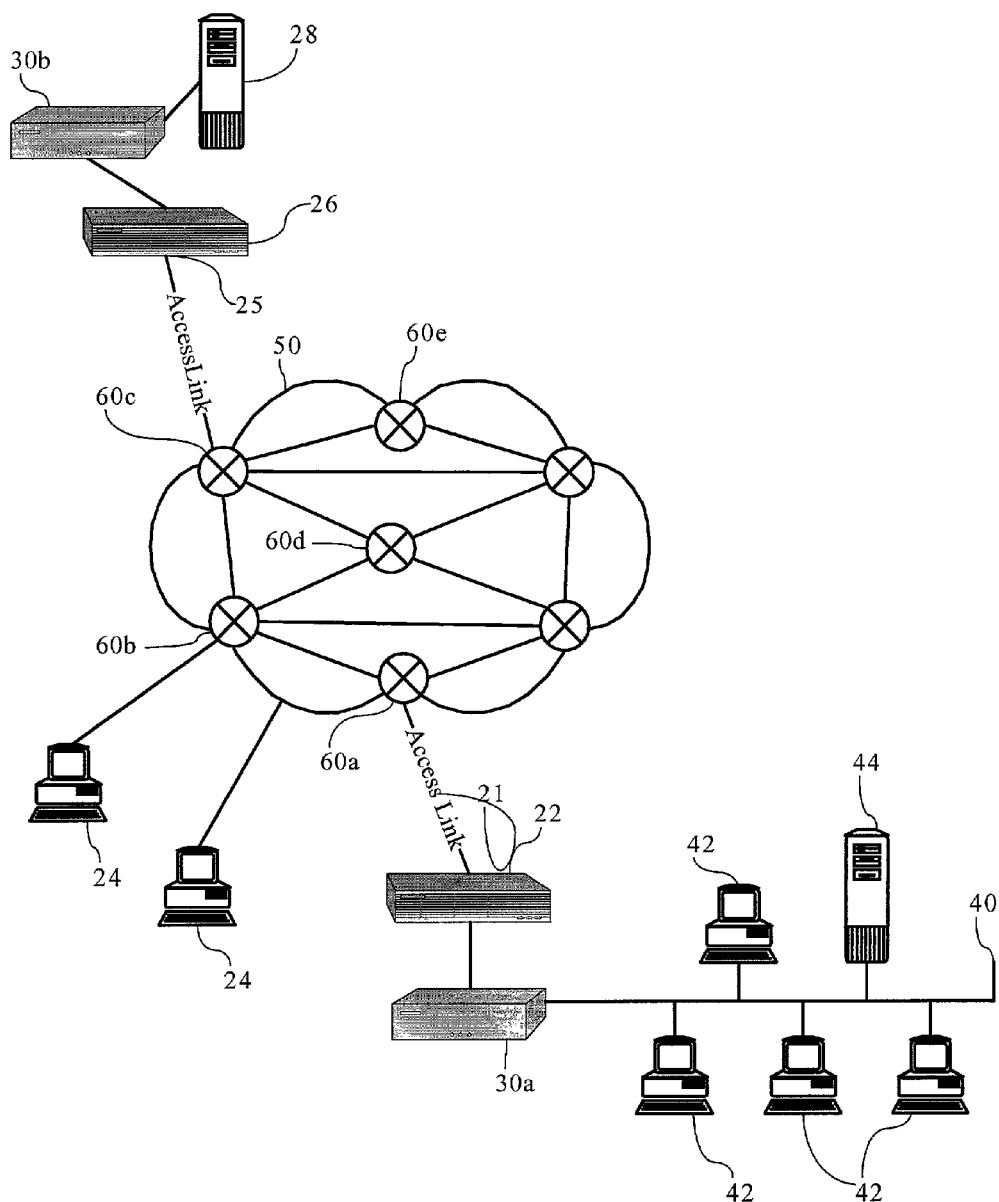
FIG. 1 is a functional block diagram illustrating a computer network environment according to an embodiment of the present invention.

FIG. 1 illustrates a packet-based computer network environment including tunnel probing devices 30a, 30b. As FIG. 1 shows, local area computer network 40 interconnects several TCP/IP end systems, including client devices 42 and server device 44, and provides access to resources operably connected to computer network 50 via router 22 and access link 21. Server 28 is a TCP/IP end system connected to computer network 50 through router 26 and access link 25. Client devices 24 are additional TCP/IP end systems operably connected to computer network 50 by any suitable means, such as through an Internet Services Provider (ISP). The computer network environment, including computer network 50 is a packet-based communications environment, employing TCP/IP protocols and has a plurality of interconnected digital packet transmission stations or routing nodes 60a–60e. As FIG. 1 shows, tunnel probing device 30a is provided between router 22 and local area computer network 40, while tunnel probing device 30b is disposed between router 26 and server 28. Tunnel probing devices 30a, 30b are operative to establish a transformation tunnels with routing nodes or other network devices in a computer network environment that include compatible transformation tunnel capabilities. Tunnel probing devices 30a, 30b are further operative to identify routing nodes or other network devices along a communications path that include compatible transformation tunnel capabilities. In one embodiment, tunnel probing devices 30a, 30b are also operable to classify data flows and, depending on the classification, probe for routing nodes or other network devices along communications paths that include compatible tunneling capabilities.

A. Tunnel Probing Device

Figure 2:
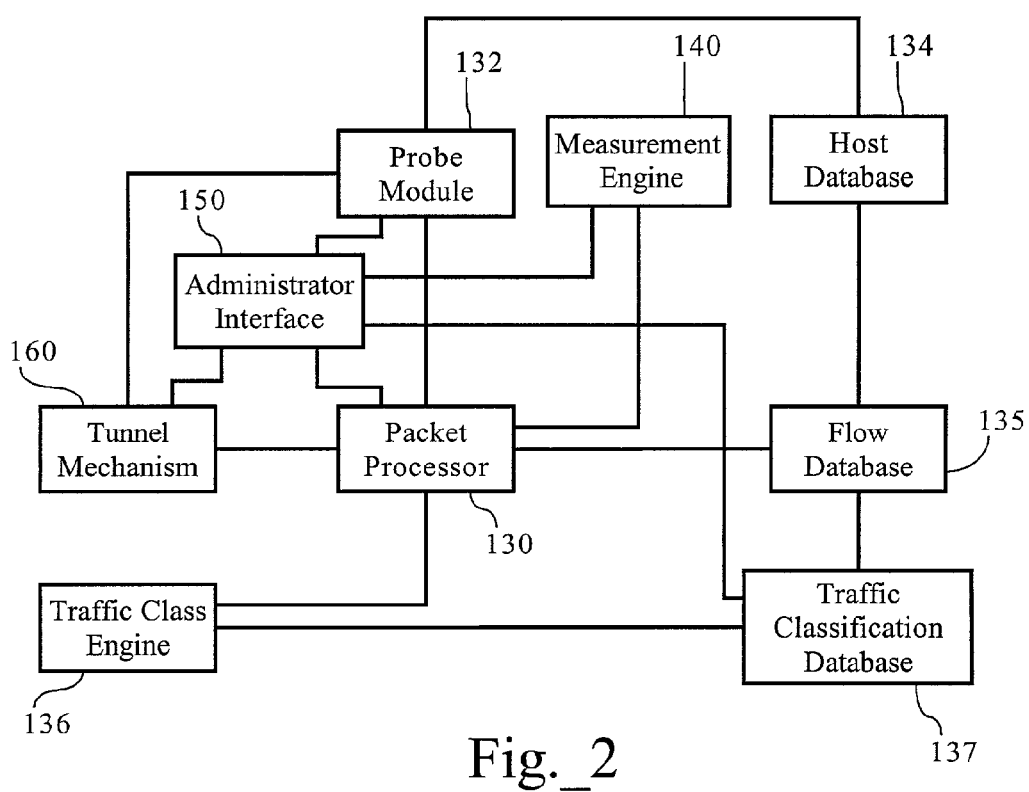
FIG. 2 is a functional block diagram illustrating the functionality associated with the tunnel probing device according to an embodiment of the present invention.

FIG. 2 is a block diagram illustrating functionality associated with tunnel probing device 30a and/or 30b. In one embodiment, tunnel probing device 30a comprises packet processor 130, probing module 132, measurement engine 140, tunnel mechanism 160, host database 134, and flow database 135. In one embodiment, tunnel probing device 30a further comprises traffic class engine 136 and traffic classification database 137. Packet processor 130 is operative to process data flows and invoke other modules and functionality associated with tunnel probing device 30a. Probe module 132 is operative to probe communication paths for routing nodes or other network devices that include compatible tunneling capabilities. Measurement engine 140 monitors operation of tunnel probing device 30a to allow for collection of data associated with bandwidth utilization across access link 21 on a source/destination host or end system level and, in one embodiment, a traffic classification level. Tunnel mechanism 160 is operative to establish and maintain transformation tunnels with compatible routing nodes or other network devices in a communications path. Host database 134 stores IP addresses and corresponding data associated with data flows traversing tunnel probing device 30a. Flow database 135 stores and maintains flow state information associated with data flows traversing tunnel probing device 30a.

Traffic class engine 136 is operative to detect traffic classes associated with data flows, as discussed more fully below. In one embodiment, traffic class engine 136 is configured to automatically create traffic classes based on the data flows traversing tunnel probing device 30a. Traffic classification database 137 stores traffic classes in association with pointers to matching rules or pointers to data structures defining such matching rules.

Administrator interface 150 facilitates the configuration of tunnel probing device 30a and allows access to report data detailing the operation of device 30a including utilization of bandwidth across access link 21 on a traffic class and/or IP address level. Administrator interface 150 allows administrators to configure threshold parameters, such as the minimum number of data flows to a specific IP address before a probe request is sent along the communication path. In one embodiment, administrator interface 150 allows an administrator to specify the traffic classes whose flows trigger operation of tunnel mechanism 160 and probe module 132. Administrator interface 150 can include a command line interface or a graphical user interface accessible, for example, through a conventional browser on client device 42.

A.1. Processing of Packets and Management of Flow and Host Databases

As discussed above, packet processor 130 is operative to monitor and process data flows traversing tunnel probing device 30a. Packet processor 130, in one embodiment, is operative to identify new data flows and create flow specification objects including attributes characterizing such data flows. In one embodiment, packet processor 130 examines data packets traversing tunnel probing device 30a for new data flows. In embodiments involving TCP/IP protocols, packet processor 130 identifies new data flows with reference to SYN and/or SYN/ACK packets. In one embodiment, when packet processor 130 encounters a new data flow it stores the source and destination IP addresses contained in the packet headers in host database 134. Packet processor 130 further constructs a flow specification object including such attributes as pointers to the source and destination IP addresses in host database 134, as well as other flow specification parameters, such as service type, protocol type and other parameters characterizing the data flow. In one embodiment, such fields can include information gleaned from examination of data within layers 2 through 7 of the OSI reference model. In one embodiment, packet processor 130 creates and stores a flow state record corresponding to the new data flow in flow database 135. In one embodiment, flow state record attributes include a pointer to a corresponding flow specification object, as well as other flow state parameters, such as TCP connection status.

Host database 134 stores IP addresses of host or TCP end systems (e.g., server 28, client device 24, etc.) associated with data flows traversing tunnel probing device 30a. In one embodiment, host database 134 stores such computer network addresses in association with probe status parameters, tunnel parameters, and measurement data. In one embodiment, probe status parameters include probe status (e.g., was path to IP address probed, is tunnel probing in progress, has a tunnel partner been determined, etc.), probe count (e.g., how many probes have been sent along path to the IP address), and last probe time (the time of the last probe). Tunnel parameters, if a tunnel has been defined, include the IP address(es) of the tunnel partner(s), the tunneling capabilities associated with each tunnel partner, and data allowing for a determination of the number of hops (or another suitable distance parameter) between tunnel probing device 30a and each tunnel partner (see below). As discussed below, in one embodiment, host database 134 stores tunnel parameter data only for tunnel partners furthest along a communications path corresponding to all, if possible, transformation tunnel capabilities of tunnel mechanism 160.

Measurement data includes data sampled by measurement engine 140 or data derived therefrom. In one embodiment, measurement data can include the number of packets sent to the IP address, the number of bytes, the number of flows associated with the IP address, and/or any other suitable usage data. In one embodiment, host database 134 is a recency database in that it stores only the IP addresses associated with the most recent data flows traversing tunnel probing device 30a. In one embodiment, the oldest entries in host database 134 are deleted as needed for new entries. Still further, in one embodiment, host database 134 is periodically reinitialized to delete all host entries to ensure that that probe information for paths to destination hosts are refreshed.

Flow database 135 stores and maintains flow state information associated with data flows traversing tunnel probing device 30a. In one embodiment, for each data flow, flow database 135 stores a flow state record including a pointer to a flow specification object (see above), as well as other flow state parameters, including TCP connection status. In one embodiment, flow database 135 releases flow state records upon termination of the corresponding data flow. In another embodiment, the oldest flow state record is deleted as needed in response to new data flows.

A.2. Measurement Engine

Measurement engine 140 samples data associated with the operation of tunnel probing device 30 and data flows traversing the device, including data allowing for measurement of bandwidth utilization across access link 21 with respect to a plurality of bandwidth utilization statistics. For example, measurement engine 140 monitors the number and size of inbound and outbound packets traversing tunnel probing device 30 on a traffic class and/or an IP address level. Such data allows for the calculation over a given analysis interval of bandwidth utilization statistics, such as average rate (bps), peak rate (bps), total bytes, and network efficiency (i.e., the number of packets/flows/bytes that are not retransmitted over the total number of packets/flows/bytes). In one embodiment, measurement engine 140 periodically recalculates bandwidth utilization statistics for each IP address and stores them in corresponding fields in host database 134. In one embodiment, such periodic sampling can occur every minute. As discussed below, this measurement data can then be analyzed over a desired time interval (e.g., by minute, quarter-hour, hour, half-day, day, etc.) to enable effective decision-making with respect to probing for potential tunnel partners.

A.3. Tunnel Mechanism

Tunnel mechanism 160 includes functionality allowing for the establishment and operation of transformation tunnels between tunnel probing device 30a and identified tunnel partners along a communications path. In one embodiment, tunnel mechanism 160 includes data transformation functionality, such as data compression or caching functionality, and tunneling functionality based on standard transport and encapsulation protocols. In one embodiment, tunnel mechanism 160 includes a variety of transformation tunnel capabilities, including the ability to employ different transport and encapsulation protocols, as well as different data transformation capabilities.

Transformation functionality generally transforms data from a first state to a second state. Compatible transformation functionality is operative to transform the data from the second state to substantially the first state. For example, according to some algorithms and data formats, de-compression does not recover all of the original data. Transformation functionality may include a variety of types and protocols. For example, tunnel mechanism may include compression and/or decompression functionality, caching functionality, and encryption and/or decryption functionality, all of a variety of types and configurations. For example, tunnel mechanism 160 may include a plurality of data compression capabilities, such as compression functionality optimized for different kinds of data (e.g., text files, image files, audio files, etc.). Data transformation can be performed on just the packet data or on the entire packet (including header data) depending the implementation. In addition, tunnel mechanism 160 can operate on packets individually, or collect packets and transform them on an aggregate basis. In addition, tunnel mechanism 160 may operate to transform data from one compression format to another, proprietary compression format.

Tunnel mechanism 160 is also operative to handle the path between tunnel probing device 30a and the tunnel partner corresponding to the path, using encapsulation and transport technologies, such as Generic Routing Encapsulation (GRE) protocol (RFC 2890), IP in IP Tunneling protocol (RFC 1853), and/or any other suitable protocol. Tunnel mechanism 160 also includes tunnel management functionality allowing for maintenance of tunnel state information, as well as recovery functionality that handles loss of tunnels, routing failures and other transmission errors, such as lost or out-of-order packet transmissions (if applicable to the transformation protocol). Tunnel mechanism 160 is also operative to recognize and handle circumstances where there are multiple paths between two end-systems.

A.4. Probe Module

Probe module 132 is operative to probe communication paths for routing nodes or other network devices that include compatible transformation tunnel capabilities. Probe module 132 is further operative to respond to probe requests transmitted by other network devices (e.g., tunnel probing module 30b, or other probing-enabled network devices).

A.4.a. Generation of Probe Requests

Figure 4:
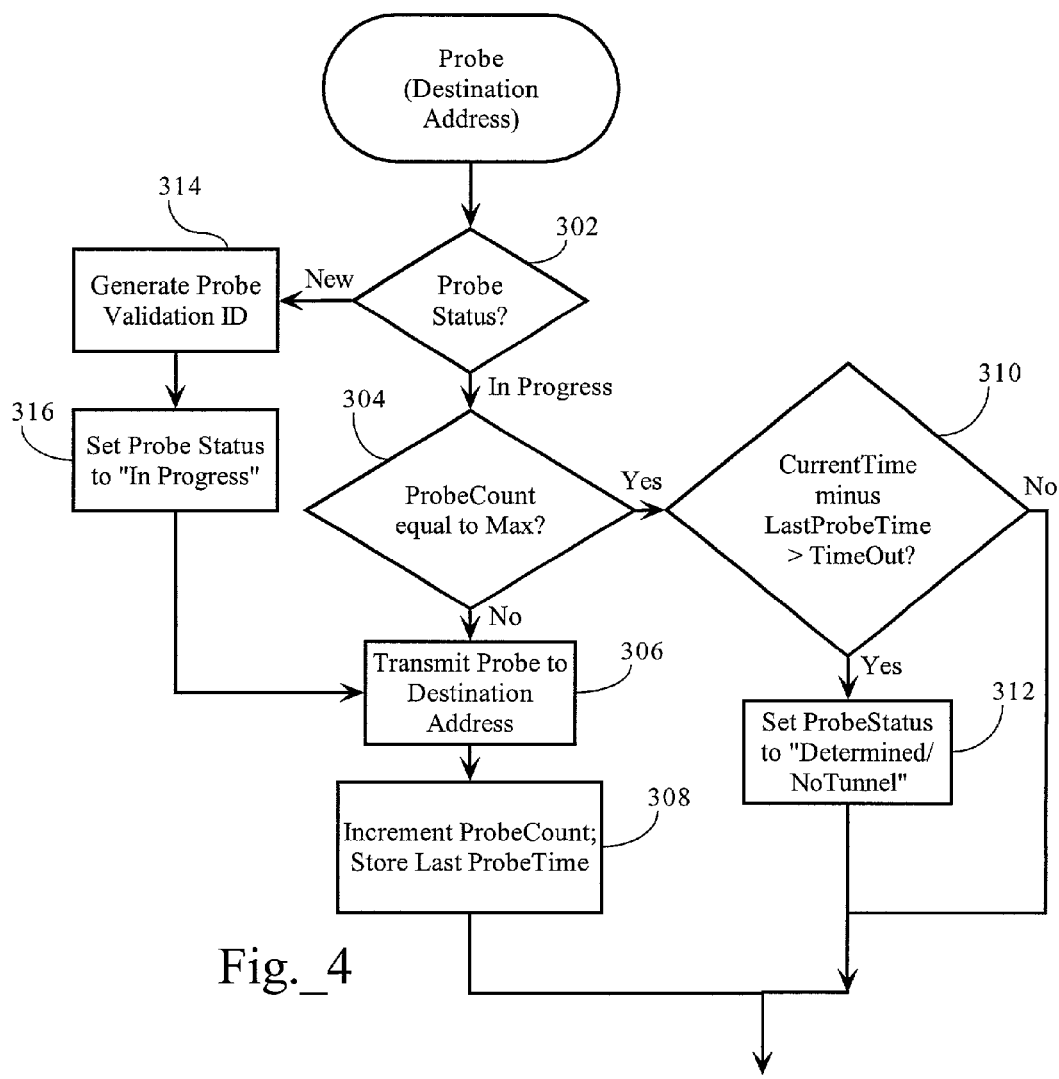
FIG. 4 is a flow chart providing a method associated with the generation and transmission of probe requests.

FIG. 4 sets forth a "Probe" method facilitating the identification of routing nodes or other network devices along a communications path that include compatible transformation tunnel capabilities. In one embodiment, when the Probe method is invoked, probe module 132 accesses host database 134 to determine the probe status associated with the destination IP address (FIG. 4, step 302). If the destination IP address has not been probed (e.g., probe status=new), probe module 132 generates a probe request including a probe validation ID for use in subsequent processes described below (step 314). Probe module 132 sets the probe status value associated with the destination IP address to "in progress" (step 316) and transmits the probe request to the destination IP address (step 306). Probe module 132 then increments the probe count parameter and updates the last probe time value associated with the destination IP address in host database 134 (step 308). In one embodiment, probe module 132 further stores the probe validation ID as a probe status parameter in host database 134 in association with the corresponding IP address. As discussed in more detail below, routing nodes and other network devices along the path to the destination IP address include functionality allowing for recognition of probe requests and the formulation and transmission of responses thereto.

If probing of the path to the given destination IP address is "in progress" (step 302), probe module 132 accesses host database 134 to retrieve the number of probes previously sent to the destination IP address. If the probe count parameter is greater than a threshold count (step 304) and the last probe sent has timed out (step 310), probe module 132 sets the probe status parameter for the destination IP address to "determined/no tunnel" (step 312). Otherwise, probe module 132 transmits an additional probe request to the destination IP address (step 306) and updates the probe count and last probe time parameters as appropriate (step 308). In one embodiment, probe module 132 includes the same probe validation ID generated with the first probe request. In another embodiment, probe module 132 generates a new probe validation ID.

Probe validation IDs can be any suitable form of identification generated using any suitable technique. For example, a probe validation ID can be a randomly generated number of any suitable length (e.g., 4 octets). In another embodiment, a probe validation ID can be a time stamp value.

A.4.b. Responding to Probe Requests

As discussed above, compatible routing nodes or other network devices along a particular path respond to probe requests transmitted to a destination IP address.

Figure 5:
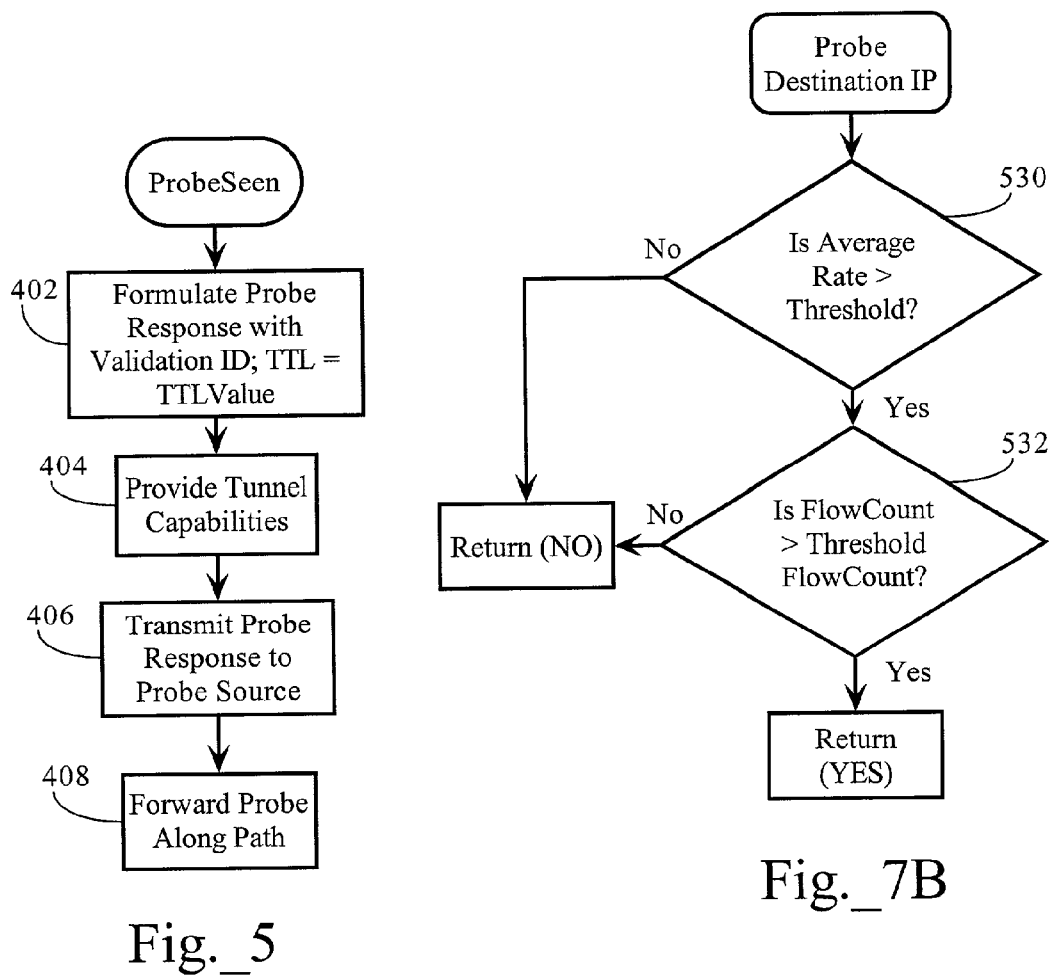
FIG. 5 is a flow chart illustrating a method involved in the generation of probe responses.

FIG. 5 illustrates a process flow involved in responding to probe requests. In one embodiment, when a probe request is detected, probe module 132 formulates a probe response, including the probe validation ID in the probe request and setting the Time-to-Live (TTL) value in the probe response packet header to a predetermined value (step 402). Probe module 132 also includes probe validation ID and the transformation tunneling capabilities associated with tunneling mechanism 160 in the probe response (step 404), and transmits the probe response to the source IP address of the probe request (step 406). Probe module 132 also forwards the probe request along the communications path for possible recognition and processing by other compatible network devices (step 408).

In one embodiment, the probe response, regardless of which network device formulates it, initially includes the same predetermined TTL value (e.g., 234, 123, etc.). In one embodiment, the TTL value is determined according to a protocol implemented by all compatible network devices. Using the same initial TTL value allows the tunnel probing device that issued the probe to determine the number of hops between it and the responding network device, as the TTL value in the probe response is decremented as it is encountered by each routing node along the path back to the tunnel probing device. Accordingly, probe module 132 subtracts the TTL value in the probe response to the predetermined TTL value to determine the hop count between it and the responding network device. As discussed below, probe module 132 compares TTL values from different probe responses to determine which responding network device is further along the path to the destination host. Of course, other suitable methods for determining relative distance along a path include executing traceroute functionality or other routing protocols to determine hop count to responding network devices.

A.4.c. Processing Probe Responses

Figure 6:
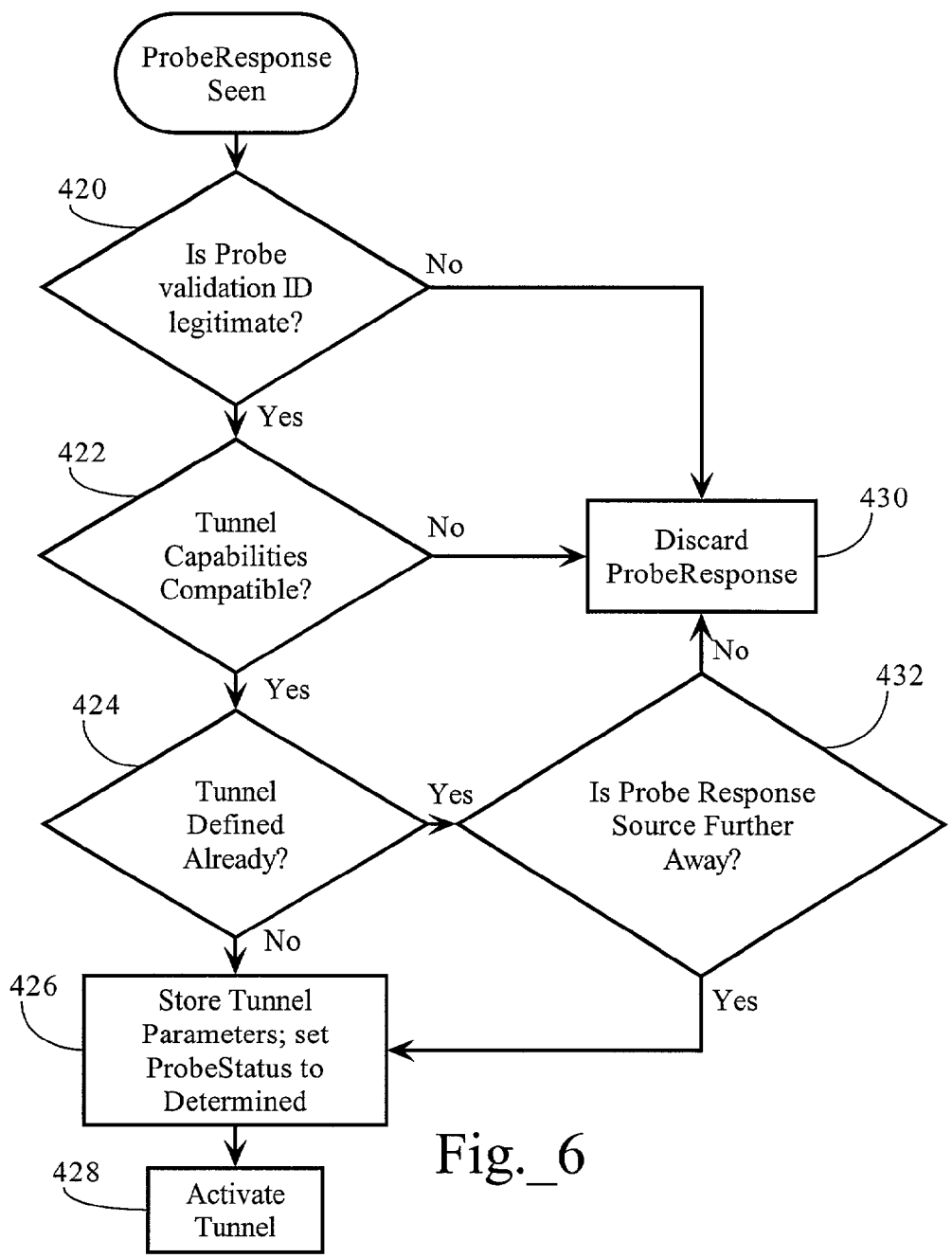
FIG. 6 is a flow chart diagram setting forth a method associated with the processing of probe responses to identify a tunnel partner in a communications path.

FIG. 6 provides a method allowing for the processing of probe responses to identify compatible tunneling partners along a communications path. When a probe response is detected, probe module 132 validates the probe response, in one embodiment, by scanning host database 134 for a probe validation ID that matches the probe validation ID contained in the response (step 420). Probe module 132 discards the probe response if the probe validation ID is not found or otherwise invalid (see step 430). Otherwise, probe module 132 then examines the transformation tunneling capabilities advertised in the probe response to determine whether they are compatible with the transformation tunneling capabilities of tunnel mechanism 160 (step 422). If the responding network device includes compatible transformation tunneling capabilities, probe module 132 then accesses host database 134 to determine whether an existing transformation tunnel of the same type has been defined for the destination IP address (step 424). If an existing tunnel of the same type has been defined, probe module 132 determines whether the responding network device is further along the path to the destination IP address (step 432). In one embodiment, this determination is performed by comparing the TTL values of the respective probe responses or hop count values derived therefrom (see above). If the responding network device is further along the path, probe module 132 stores tunnel parameters associated with the responding network device in host database 134 and sets the probe status parameter associated with the destination IP address to "determined/tunnel defined" (step 426). In one embodiment, tunnel parameters include the IP address for the end of the tunnel (i.e., the responding network device), and other data associated with the tunnel, such as tunnel capability(ies), capability type(s), encapsulation protocol (e.g., protocol type, etc.). In one embodiment, probe module 132 then passes the transformation tunnel capabilities to tunnel mechanism 160 to allow for activation/initialization of the tunnel for subsequent data flows (step 428). In one embodiment, tunnel mechanism 160 determines whether the same transformation tunnel already exists for a different destination IP address. Otherwise, tunnel mechanism 160 uses the tunnel parameters defined above to initialize the transformation tunnel (e.g., IP address, exchanges of keys, reservation of memory, and/or other tunnel initialization operations).

In one embodiment, the probe response includes data allowing for the association of a tunnel to a subnet or range of address within a subnet. In one embodiment, a responding network device transmits a probe response that further includes information on the subnet or subnet range that includes the destination IP address and to which the responding network device has reachability. Such information allows probe module 132 to map the resulting transformation tunnel to a subnet or range of IP addresses within the subnet, thereby obviating the need to probe each address within the subnet.

A.4.d. Exemplary Implementation of Probe Requests and Responses

Probe requests and responses can be implemented using any suitable protocol and technology. In one embodiment, the present invention takes advantage of existing Resource ReSerVation Protocol (RSVP) signaling technologies to transmit probe requests and responses. [See Braden et al., "Resource ReSerVation Protocol (RSVP)—Functional Specification", RFC 2205, September 1997; incorporated by reference herein.] Specifically, the present invention extends existing RSVP protocols to transmit probe requests and responses. For example and in one embodiment, probe module 132 formulates a probe request as an RSVP PATH message of the null service type and transmits the RSVP PATH message to the destination host. See Bernet et al., "Specification of the Null Service Type", RFC 2997, November 2000; incorporated by reference herein. In one form, probe module 132 offers the null service type in the ADSPEC object and adds a reference to the null service type in the SENDER_TSPEC object included with the RSVP PATH message. Probe module 132 includes policy elements in a POLICY-DATA object associated with the RSVP PATH message relating to the probe request. See Herzog, "RSVP Extensions for Policy Control", RFC 2750, January 2000; incorporated by reference herein. For example, the policy elements include the IP address of tunnel probing device 30a, a probe validation ID, and any other suitable parameters, such as probing protocol version, etc. Routing nodes that do not include the null-service-type that adhere to the RSVP specification simply pass the RSVP PATH message on to the next routing node in the path. Null-service-enabled routing nodes or other network devices along the path interpret the RSVP PATH message as requesting no specific service type or quantifiable resource. Rather, null-service-enabled routing nodes operate to construct probe responses as discussed above. The destination host, assuming it has no RSVP and/or tunneling capabilities, discards the RSVP PATH message.

In one embodiment, the responding network device can transmit a probe response to tunnel probing device 30a as a RSVP RESV message. In one embodiment, the RSVP RESV message includes a FLOWSPEC and/or other suitable objects requesting the null service and having attributes such as the IP address of the responding network device, the probe validation ID transmitted with the request and the transformation tunnel capabilities of the network device. Of course, the probe response could be implemented using a different protocol entirely.

Extensions of other existing protocols and technologies, which are generally innocuous or ignored by end systems, can be employed to transmit probe requests and responses. Other suitable protocols include the Internet Control Message Protocol (ICMP) (RFC 792), ECHO (RFC 862/STD-20), and DISCARD (RFC 863/STD-21).

A.4.e. Other Embodiments

The present invention permits a variety of embodiments. For example, probe module 132 can operate in a mode where probe requests include a desired tunnel capability. In such an embodiment, compatible routing nodes or other network devices along the path are operative to pass on the probe request without responding if they do not include the desired tunneling capability.

A.5. Traffic Classification

A traffic class is a logical grouping of data flows that share the same characteristic or set of characteristics-e.g., a specific application, protocol, IP address, MAC address, port, etc. In one embodiment, each traffic class has at least one matching rule defining the criteria used for identifying a specific traffic type. In one embodiment, tunnel probing device 30 includes functionality allowing for classification of network traffic based on information from layers 2 to 7 of the OSI reference model.

Traffic classification database 137 stores traffic classes associated with data flows that traverse access link 21. Traffic classification database 137 stores the traffic classes and corresponding data (e.g., matching rules, tunnel probing parameters, etc.) related to each traffic class in a hierarchical tree. This tree is organized to show parent-child relationships-that is, a particular traffic class may have one or more subordinate child traffic classes with more specific characteristics (matching rules) than the parent class. In one embodiment, the root traffic classifications are "/inbound/" and "/outbound/" data flows. Any data flow not explicitly classified is classified as "/inbound/default/" or "/outbound/default/". In one embodiment, administrator interface 150 displays the traffic class tree and allows for selection of a traffic class and the configuration of tunnel probing controls for that traffic class (e.g., whether to probe for or create tunnels for data flows involving the traffic class). Administrator interface 150 also allows an administrator to manually create a traffic class by specifying a set of matching rules and, as discussed below, also automatically creates traffic classes by monitoring network traffic across access link 21 and classifying data flows according to a set of criteria to create matching rules for each traffic type.

Traffic class engine 136, in one embodiment, monitors network traffic passing through access link 21 and applies matching rules to identify a traffic class associated with each data flow. In one embodiment, traffic discovery engine 136 creates traffic classes automatically in response to data flows traversing tunnel probing device 30 and stores such traffic classes in traffic classification database. Automatic traffic classification is disclosed in application Ser. No. 09/198, 090, now U.S. Patent No. 6,412,000. which is incorporated herein by reference. In one embodiment, traffic class engine 136 must detect a minimum number of data flows for a given traffic type within a predefined period before it creates a traffic class in traffic classification database 137. In one embodiment, such discovered traffic classes are, by default, attached to or associated with either the "/inbound/autodiscovered/" or "/outbound/autodiscovered/" bandwidth control category, as appropriate. As discussed below, administrator interface 150 allows for configuration of tunnel mechanism controls for auto-discovered discovered and other traffic classes.

B. Operation

Figure 3:
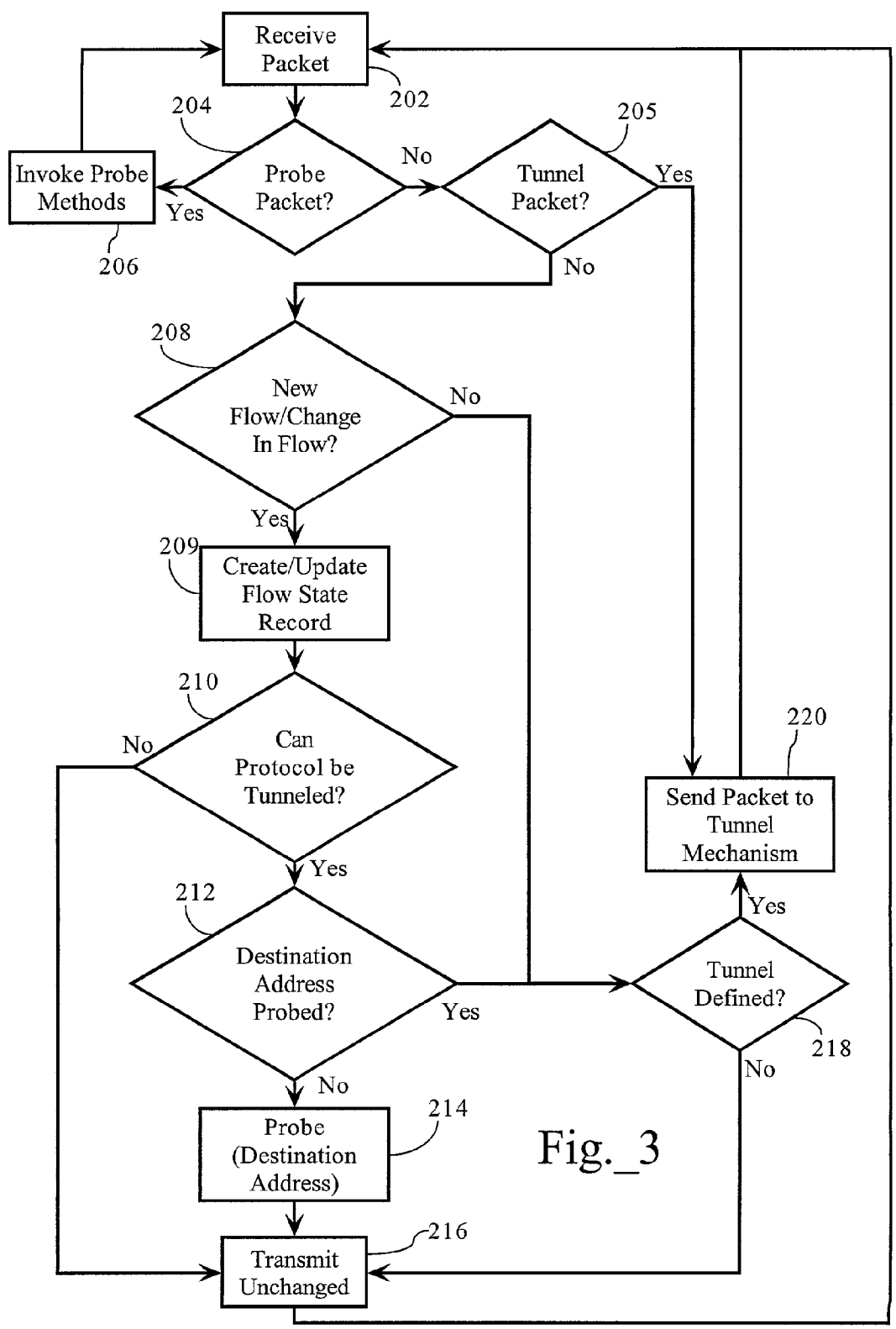
FIG. 3 is a flow chart setting forth a method for monitoring data flows according to an embodiment of the present invention.

FIG. 3 illustrates a method associated with processing packets transmitted across tunnel probing device 30. In one embodiment, packet processor 130 receives a data packet (FIG. 3, step 202) and determines whether it is associated with operation of probe module 132 (i.e., a probe request or a probe response) (step 204). As discussed above, measurement engine 140 monitors the flow of packets across tunnel probing device 30a to log measurement data associated with host addresses in host database 134. If the packet is associated with a probe request or response, packet processor 130 invokes probe module 132 to invoke the appropriate functionality discussed above (step 206) (see Section A.4, supra).

If the packet is not associated with a probe request or a response, packet processor 130 determines whether the packet is associated with a tunnel implemented by tunnel probing device 30*a* (step 205). If so, packet processor 130 sends the packet to tunnel mechanism 160, which decapsulates (removes the tunnel header from) the tunnel packet, transforms the data and transmits it to the destination host (step 220). Otherwise, packet processor 130 determines whether the packet corresponds to a new data flow or represents a change to an existing data flow (step 208). Methods for determining new data flows and assigning packets to existing data flows are well known in the art and also depend on the particular transport layer protocol employed. For a TCP packet, packet processor 130 determines a new data flow by detecting SYN and/or SYN/ACK packets. In other embodiments, packet processor 130 may have to encounter multiple packets to identify and fully characterize a new data flow (e.g., identify a traffic class, etc.). For example, U.S. Pat. No. 6,046,980 issued to Packer, identified above, discloses methods for classifying packet network flows. Methods for determining changes to data flows are also well known in the art. For example, an email may include an attached digital image file. Accordingly, while the initial packets in the data flow may include simple text data, subsequent packets may contain image data. Packet processor 130, in one embodiment, is operative to detect such changes in the characteristics of the data flow by examining data encapsulated in upper layers of each packet.

If the packet is a new data flow, packet processor 130 creates a flow state record for the new data flow in flow database 135 (step 209). In one embodiment, packet processor 130 analyzes the source and destination IP addresses in the packet header and scans host database 134 for matching entries. If no matching entries exist, packet processor 130 creates new entries for the source and destination IP addresses. As discussed above, packet processor 130 constructs a flow specification object including attributes characterizing the data flow, including pointers to the source and destination IP address entries in host database 134. Other flow specification attributes can include port number, service type, protocol, etc. In addition, if the packet represents a change to the data flow, packet processor 130 changes attributes of the flow state record and/or flow specification object as appropriate.

Packet processor 130 analyzes the packet(s) associated with the flow to determine whether tunnel mechanism 160 can operate to transform or optimize the data in the flow (step 210). The initial SYN or SYN/ACK packets often reveal little about the format of the data in subsequent packets associated with the flow and/or whether tunnel mechanism 160 can operate on the data flow; however, if tunnel mechanism 160 operates on TCP/IP packets generally, for example, packet processor 130 may invoke probe module 132 or pass the packet to tunnel mechanism 160 merely by detecting a TCP/IP packet. Moreover, as additional packets associated with the flow traverse tunnel probing device 30*a*, packet processor 130 analyzes the packets to further characterize the data flow and determines whether tunnel mechanism 160 may operate on the data flow. In one embodiment, the flow specification object is also available to the tunnel mechanism 160 which can analyze attributes of the object to make separate determinations with respect to tunneling and transformation operations. In one embodiment, the flow specification object or a copy of it is stored in association with the packet and in the same buffer structure to facilitate access to the flow specification object by tunnel mechanism 160.

If the data associated with the flow can be transformed by tunnel mechanism 160, packet processor 130 then accesses host database 134 to check the probe status parameter to determine whether the path to the destination IP address has already been probed (step 212). If the path to the destination has not been probed, packet processor 130 invokes a Probe method executed by probe module 132, passing the destination IP address as a parameter (step 214) (see Section A.4.a., supra). To avoid delaying transmission of the flow, packet processor 130 passes the packet to router 22 unchanged for further transmission to the destination host (step 216). Otherwise, if the path to the destination IP address has been probed and a compatible tunnel has been defined (see steps 212 and 218), packet processor 130 channels the packet to tunnel mechanism 160 (step 220).

FIGS. 7A and 7B illustrate an alternative embodiment of the present invention. As the diagrams provide, embodiments of the present invention can restrict or limit the transmission of probe requests based on the level of data flow activity associated with the destination IP address, as measured by measurement engine 140. In addition, embodiments of the present invention can limit what network traffic is tunneled based on a traffic type or class associated with the data flow.

In one embodiment, when packet processor 130 detects a new data flow (step 508), packet processor 130, as above, creates a flow state record for the new data flow in flow database 135 (step 509), including a flow specification object. To identify a traffic class associated with the data flow, packet processor 130 passes the flow specification object to traffic class engine 136. As discussed above, traffic class engine 136 applies matching rules based on the attribute values of the flow specification object and identifies a traffic class associated with the data flow. In one embodiment, the flow state record in flow database 135 includes a pointer to the identified traffic class in traffic classification database 137. As FIG. 7A shows, the traffic class associated with a data flow may also control whether it is tunneled by tunnel mechanism 160. Assuming a tunnel is defined, packet processor 130 accesses traffic classification database 137 to determine whether data flows associated with the traffic class can be tunneled (step 519). Other criteria can be used in addition to or in lieu of traffic class, such as the average rate, flow count and other usage statistics discussed above.

Assuming the data can be tunneled and the destination IP address has not been probed (see above), packet processor 130 determines whether data flow activity associated with the IP address has risen above a threshold level (step 513). This determination can be made with respect to one criterion or a plurality of criteria. FIG. 7B provides three exemplary criteria for determining a threshold level of activity. For example and in one embodiment, packet processor 130 accesses host database 134 to determine the average rate (e.g., bits-per-second [bps]) of data flows to the destination IP address over an analysis interval and compares this average rate to a threshold value (step 530). In addition, packet processor 130 determines whether the number of data flows to the destination IP address over an analysis interval is above a threshold value (step 532). Various other criteria can be used, such as the total number of bytes transmitted to the IP address over an analysis interval. The traffic class associated with the data flow can also control whether a probe request is transmitted along the path to the destination.

In addition, while FIG. 7B illustrates an embodiment where all tests must be passed, other embodiments can probe if one test or a threshold number of tests are passed. In one embodiment, administrator interface 150 allows a network administrator to turn on/off such determinations and configure corresponding threshold values discussed above.

C. Exemplary Operating Environments

FIG. 1 illustrates a computer network environment including tunnel probing devices 30a, 30b and routing nodes 60a, 60b, 60c, 60d, and 60e. As discussed above, tunnel probing device 30a is operative to probe paths to destination hosts for routing nodes or other network devices having compatible tunneling capabilities. Tunnel probing device 30b operates in a similar manner. The present invention allows for a wide variety of implementations and can operate in connection with routing nodes or other network devices of differing configurations. For example, although FIG. 1 shows tunnel probing device 30a separately from router 22, the functionality of tunnel probing device 30a can be integrated into router 22 and/or other routing nodes (e.g., 60a–60e).

In one embodiment, any one or all of routing nodes 60a–e can include all or a subset of the tunnel probing functionality discussed above. At a minimum, a potential tunnel partner in a communications path such as routing node 60c, for example, must include probe functionality for recognizing probe requests and transmitting probe responses (Section A.4.b., supra) and a tunnel mechanism including at least one transformation tunnel capability (e.g., decompression of image files, caching functionality, etc.). However, in one embodiment, any of routing nodes 60a–e can include all of the tunnel probing functionality discussed above. Accordingly, as a new data flow traverses a path, each probing-enabled device transmits probe requests in the direction of the flow. Still further, the compatible network device need not have routing capabilities; rather, it must merely be operably connected to a communications path and include probe functionality for recognizing probe requests and transmitting probe responses and a transformation tunnel mechanism including at least one transformation tunnel capability.

To illustrate the operation of a computer network including the tunnel probing functionality discussed above, assume that server 28 is a web server responsive to HTTP requests transmitted by network access devices, such as client computers 42. Specifically, when a browser residing on client computer 42 composes an HTTP request, client computer 42 ultimately issues a first synchronization (SYN) packet to server 28. Packet processor 130 of tunnel probing device 30a recognizes the new data flow and transmits a probe request in the direction of the flow to server 28. The probe request travels along a communications path that, for didactic purposes, includes routing nodes 60a, 60b, 60c, router 26, and tunnel probing device 30b. Each routing node or other network device along the path that includes functionality allowing for recognition of the probe request transmits a probe response to tunnel probing device 30a and passes the probe request on to the next hop in the path. Furthermore, assuming that a routing node in the path, such as routing node 60a, includes tunnel probing functionality (see Sections A.4.a., c.), the first SYN packet also causes that routing node to issue its own probe request in the direction of the data flow, and so on. Ultimately, the probe request reaches server 28, which discards the probe request if it does not itself include probe response functionality (see Section A.4.b) and transformation tunnel capabilities. As discussed above, tunnel probing device 30a receives probe responses, if any, from responding network devices, and selects the network device furthest along the path (e.g., tunnel probing device 30b). In addition, since a particular network device may include different data transformation capabilities, tunnel probing device 30a, in one embodiment, is operative to keep track of the furthest network device along the path for each compatible transformation tunnel capability included in tunnel mechanism 160 (e.g., image decompression, text decompression, etc.).

In addition, tunnel probing device 30b operates to probe the path back to client computer 42 in the same manner, as server 28 issues a SYN/ACK packet in response to the first SYN packet. In one embodiment, tunnel probing device 30b probes the path back to client computer 42 to find potential tunnel partners. If a tunnel partner is found, tunnel probing device 30b can operate to transform and tunnel subsequent packets associated with the data flow, and/or subsequent data flows, to client computer 42.

Lastly, although the present invention has been described as operating in connection with end systems employing the TCP and IP protocols, the present invention has application in computer network environments employing any suitable transport layer and network layer protocols. Moreover, while the embodiments described above operate primarily to compress or cache data associated with network traffic, the tunnel mechanisms can perform a wide variety of data transformations and/or optimizations without departing from the scope of the present invention. Accordingly, the present invention has been described with reference to specific embodiments. Other embodiments of the present invention will be apparent to one of ordinary skill in the art. It is, therefore, intended that the claims set forth below not be limited to the embodiments described above.

What is claimed is:

1. A method allowing for dynamic detection of network devices located along a communications path that include compatible transformation tunnel capabilities, at least one of the network devices operative to recognize probe requests and transmit a probe response including transformation tunnel capabilities in response to the probe request, the method comprising the steps of:

detecting a first data flow to a destination host;
  probing the path to the destination host to discover the network address of at least one of the network devices having compatible transformation tunnel capabilities; and,
  if a network address of a network device is discovered in the probing step, transforming subsequent data flows, or subsequent packets in the first data flow, to the destination host from a first state to a second state and tunneling the data flows, or the subsequent packets in the first data flow, to the discovered network device.

2. The method of claim 1 wherein the probing step comprises the steps of
  transmitting a probe request to the destination host; and
  receiving a probe response from a network device in the path to the destination host.

3. The method of claim 2 further comprising the step of
  selecting the network device furthest along the path to the destination host, if a plurality of network devices are discovered in the probing step.

4. The method of claim 3 wherein the responding network devices transmit probe responses in response to probe requests, wherein the probe responses are TCP/IP packets including a predefined Time-To-Live value; and the selecting step is determined on the basis of the Time-To-Live values of the probe responses transmitted by the plurality of network devices.

5. The method of claim 1 further comprising the step of transforming, at the discovered network device, the data flows from the second state to a third state; and transmitting the data flows to the destination host.

6. The method of claim 5 wherein the third state is substantially the same as the first state.

7. The method of claim 1 wherein the probing step is conditioned on detection of a threshold level of activity associated with the destination host.

8. The method of claim 7 wherein the threshold level of activity comprises a minimum number of data flows to the destination host over an analysis interval.

9. The method of claim 7 wherein the threshold level of activity comprises a minimum number of bytes transmitted to the destination host over an analysis interval.

10. The method of claim 7 wherein the threshold level of activity comprises a minimum average data flow rate associated with the destination host over an analysis interval.

11. The method of claim 1 further comprising the step of selecting the network device furthest along the path to the destination host, if a plurality of network devices are discovered in the probing step.

12. The method of claim 1 wherein the transforming step comprises compressing data associated with the data flows in a format the discovered network device can decompress.

13. The method of claim 1 wherein the transforming step comprises caching data associated with the data flows.

14. The method of claim 1 wherein the transforming step comprises encrypting data associated with the data flows in a format the discovered network device can decrypt.

15. A method allowing for optimization of communications paths associated with a computer network by dynamic detection of network devices located along a communications path that include compatible transformation tunnel capabilities, at least one of the network devices operative to recognize probe requests and transmit a probe response including transformation tunnel capabilities in response to the probe request, the method comprising the steps of:
  detecting a data flow to a destination host;
  if the path to the destination host has not been probed, then:
    probing the path to the destination host to discover the network address of a network device having compatible transformation tunnel capabilities; and,
    associating a network device discovered in the probing step with the destination host; and,
  if a network device is associated with a destination host, transforming data flows to the destination host from a first state to a second state and tunneling the data flows to the associated network device.

16. The method of claim 15 wherein the probing step comprises the steps of
  transmitting a probe request to the destination host; and
  receiving a probe response from a network device in the path to the destination host.

17. The method of claim 15 further comprising the step of transforming, at the discovered network device, the data flows from the second state to a third state; and transmitting the data flows to the destination host.

18. The method of claim 17 wherein the third state is substantially the same as the first state.

19. The method of claim 15 wherein the probing step is conditioned on detection of a threshold level of activity associated with the destination host.

20. The method of claim 15 further comprising the step of selecting the network device furthest along the path to the destination host, if a plurality of network devices are discovered in the probing step.

21. The method of claim 20 wherein the responding network devices transmit probe responses in response to probe requests, wherein the probe responses are TCP/IP packets including a predefined Time-To-Live value; and the selecting step is determined on the basis of the Time-To-Live values of the probe responses transmitted by the plurality of network devices.

22. An apparatus allowing for automatic detection of network devices located in a communications path that include compatible transformation tunnel capabilities, comprising:
  a packet processor operably connected to a computer network to monitor data flows traversing communication paths associated with the computer network to respective destination hoses;
  a transformation tunnel mechanism including transformation tunnel capabilities operative to transform data flows from a first state to a second state;
    wherein the transformation tunnel mechanism is further operative to establish a tunnel with a network device having compatible transformation tunnel capabilities located in a communications path associated with the computer network;
  a probe module operative to probe for network devices along communications paths to destination hosts that include compatible transformation tunnel capabilities in response to data flows detected by the packet processor, wherein the probe module is further operative to obtain the network address of a network device having compatible transformation tunnel capabilities;
    wherein the probe module is operative to associate destination hosts with respective network devices along communication paths thereto having compatible transformation tunnel capabilities;
    wherein the packer processor is further operative to channel data flows to the transformation tunnel mechanism, wherein the channeled data flows are bound for destination hosts associated with network devices identified by the probe module.

23. The apparatus of claim 22 wherein the probe module is operative to transmit probe requests along communication paths to destination hosts in response to new data flows, and wherein the probe request causes compatible network devices along the path to communicate transformation tunnel capabilities to the apparatus.

24. The apparatus of claim 22 wherein the packet processor is operative to identify new destination hosts associated with data flows and store the computer network address of the destination host in a database.

25. The apparatus of claim 24 wherein the probe module stores network devices having compatible transformation tunnel capabilities in the database in association with corresponding destination hosts.

26. The apparatus of claim 22 further comprising a traffic class engine operative to classify data flows traversing the packet processor into one of a plurality of traffic types;
  wherein traffic types associated with data flows are operative to condition the operation of the probe module with respect to the destination hosts associated with such data flows.

27. The apparatus of claim 22 further comprising a traffic class engine operative to classify data flows traversing the packet processor into one of a plurality of traffic types;

wherein the traffic types associated with the data flows are operative to condition the channeling of such data flows to the transformation tunnel mechanism.

28. The apparatus of claim 27 wherein traffic types associated with data flows are further operative to condition the operation of the probe module with respect to the destination hosts associated with such data flows.

29. A system allowing for dynamic detection of network devices that include compatible transformation tunnel capabilities, the network devices located along a communications path between a first host node and a second host node, comprising
- a tunnel probing device operably connected to a computer network; wherein the tunnel probing device comprises:
- a packet processor operative to monitor data flows traversing communication paths associated with the computer network to respective destination hosts;
- a transformation tunnel mechanism including transformation tunnel capabilities operative to transform data flows from a first state to a second state;
    - wherein the transformation tunnel mechanism is further operative to establish a tunnel with a network device having compatible transformation tunnel capabilities located in a communications path associated with the computer network;
- a probe module operative to probe for network devices along communications paths to destination hosts that include compatible transformation tunnel capabilities in response to data flows detected by the packet processor, wherein the probe module is further operative to obtain the network address of a network device having compatible transformation tunnel capabilities;
    - wherein the probe module is operative to associate destination hosts with respective network devices along communication paths thereto having compatible transformation tunnel capabilities;
    - wherein the packet processor is further operative to channel data flows to the transformation tunnel mechanism, wherein the channeled data flows are bound for destination hosts associated with network devices identified by the probe module; and,
- at least one network device operably connected to the computer network, wherein the network device comprises a transformation tunnel mechanism including at least one transformation tunnel capability; wherein the network device is operative to communicate transformation tunnel capabilities to the tunnel probing device in response to probe requests.

* * * * *

UNITED STATES PATENT AND TRADEMARK OFFICE
CERTIFICATE OF CORRECTION

| | | |
|---|---|---|
| PATENT NO. | : 7,013,342 B2 | Page 1 of 1 |
| APPLICATION NO. | : 10/015826 | |
| DATED | : March 14, 2006 | |
| INVENTOR(S) | : Guy Riddle | |

It is certified that error appears in the above-identified patent and that said Letters Patent is hereby corrected as shown below:

Column 16, line 39, change "packer" to --packet--

Signed and Sealed this

Seventh Day of August, 2007

JON W. DUDAS
*Director of the United States Patent and Trademark Office*